United States Patent [19]
Dalton

[11] 3,874,682
[45] Apr. 1, 1975

[54] LOAD LEVELING SYSTEM
[75] Inventor: Thomas B. Dalton, Muskegon, Mich.
[73] Assignee: Westran Corporation, Muskegon, Mich.
[22] Filed: May 4, 1973
[21] Appl. No.: 357,497

[52] U.S. Cl........ 280/6 H, 280/150.5, 137/625.68, 251/82
[51] Int. Cl............................. B60b 9/12
[58] Field of Search............ 280/6 R, 6 H, 6.1, 6.11, 280/150.5; 254/45 R, 86 H; 137/625.21, 625.24, 625.31, 625.32, 444, 449, 625.68; 251/82

[56] References Cited
UNITED STATES PATENTS

| | | | |
|---|---|---|---|
| 2,471,289 | 5/1949 | Sedgwick | 137/625.21 |
| 2,650,059 | 8/1953 | Hjulian et al. | 137/449 |
| 2,812,193 | 11/1957 | Grace | 280/150.5 |
| 3,556,151 | 1/1971 | Masuda | 137/625.21 |

Primary Examiner—Philip Goodman
Assistant Examiner—John A. Carroll
Attorney, Agent, or Firm—Hauke, Gifford, Patalidis & Dumont

[57] ABSTRACT

A system for use with semi-trailers and the like which allows raising and lowering of the trailer to be accomplished hydraulically in a smooth, safe manner, providing manual control means whereby the trailer load bed may be maintained in a horizontal attitude during the raising and lowering. The system consists of a hydraulic power source, a plurality of hydraulic cylinders appropriately arranged to effect the raising and lowering of the trailer, and a manually operated, rotary actuated flow control valve which serves to selectively control the rate of travel of the cylinder pistons on either side of a vertical plane along the trailer's longitudinal axis, so that in spite of load imbalance, the trailer load bed attitude may be maintained.

3 Claims, 8 Drawing Figures 3,874,682

LOAD LEVELING SYSTEM

BACKGROUND OF THE INVENTION

The present invention is directed to the prevention of damage to trailers and/or cargo transported therein during the process of disconnecting semi-trailers from the tractors by which they are pulled. To disconnect the trailer, it is necessary to lift the end of the trailer to a height sufficient to disengage the coupling joining the tractor and trailer. The tractor is then driven away, and the front of the trailer is lowered until the trailer load bed is again level. This decoupling process necessarily involves an upward displacement of the center of gravity of the trailer, multiplying the effect of any forces acting on the trailer and tending to tip the trailer about its longitudinal axis.

It is an object of the present invention to provide a system for the trailer for correcting this tendency for the trailer to tip as it is being decoupled. The system includes a manually operated flow control valve operable to vary the rate of movement of the actuating means on one side of the trailer in inverse proportion to the rate of the actuating means on the other side of the trailer to thereby equalize the rate of ascent and descent across the load bed.

DESCRIPTION OF THE DRAWINGS

This and other objects and advantages will appear more clearly to those skilled in the art from the following specification and drawings in which like numerals refer to like parts throughout the several views, and in which.

DESCRIPTION OF THE PREFERRED EMBODIMENT

Figure 1:
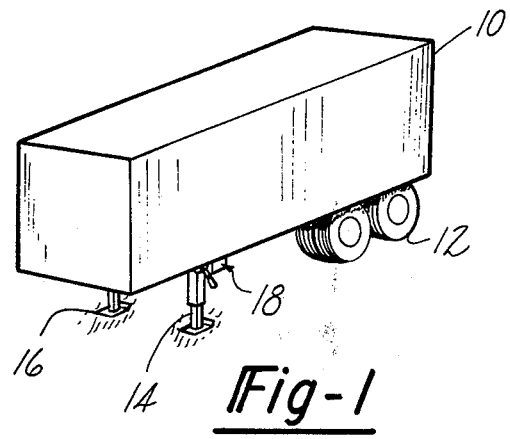
FIG. 1 is a perspective view of a semi-trailer on which the system of the present invention is installed.

Referring now to the drawings, a semi-trailer 10 is shown in the position it assumes when not attached to a tractor, that is, when it is supported in a horizontal attitude by its rear wheels 12 and its landing gear 14 and 16. The load leveling system of this invention is installed so that a rotary actuated flow control device 18 is positioned adjacent one side of the trailer, preferably but not necessarily the curb side, to allow ease of access for the operator.

Figure 2:
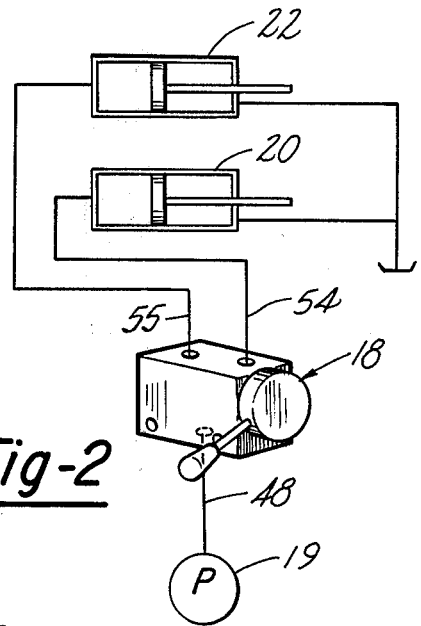
FIG. 2 is a schematic representation of the present invention.

Operation of the load leveling device may be understood by reference to FIGS. 1 and 2. Raising and lowering the forward end of the trailer 10 is accomplished through the use of conventional hydraulic actuating means coupled to the landing gear legs 14 and 16. A hydraulic power source 19 (FIG. 2) supplies pressurized fluid to conventional hydraulic cylinders 20 and 22, which are used to linearly actuate the landing gear. The manually actuated flow control device 18 is provided intermediate the power source 19 and the cylinders 20 and 22 and allows control of the flow to and from the cylinders, such that a manual input tending to increase the flow to or from the cylinder 20 actuating landing gear leg 14 will decrease the flow to or from the cylinder 22 actuating landing gear leg 16.

Figure 3:
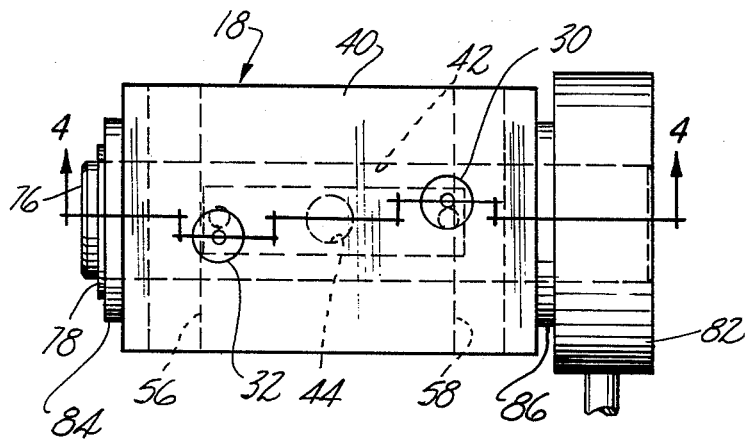
FIG. 3 is a top view of a flow control valve of the present invention.
Figure 4:
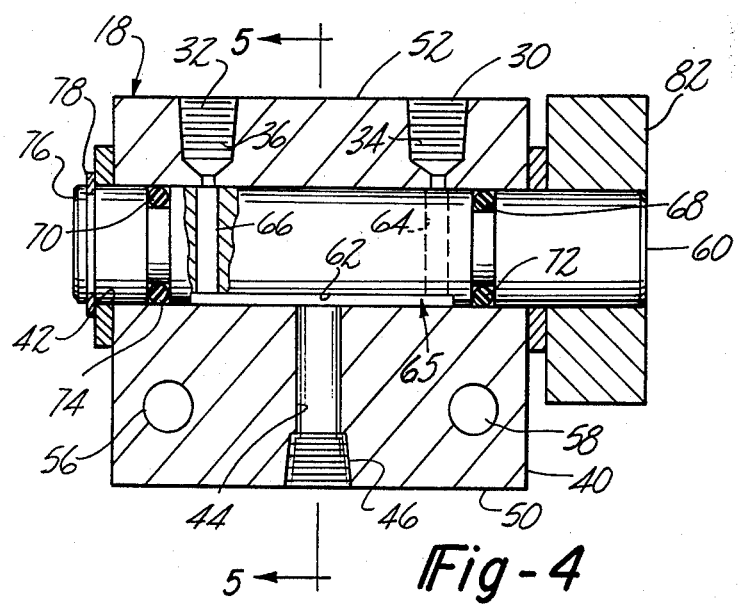
FIG. 4 is a sectional view of the rotary control valve of the present invention taken substantially along line 4—4 of FIG. 3.
Figure 5:
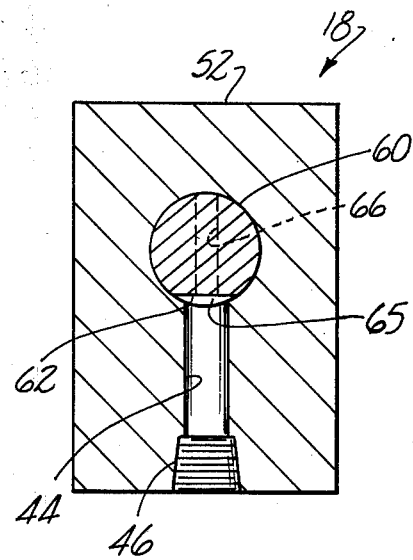
FIG. 5 is a sectional view taken substantially along line 5—5 of FIG. 4.

As can best be seen in FIGS. 3, 4 and 5, the flow control device 18 comprises a housing 40 having a bore 42 therethrough. A second bore 44, suitably machined at its outer extremity, as with threads, to allow connection to the fluid conduit 48 (FIG. 2) for connecting it to the hydraulic power supply 19, is formed perpendicular to the longitudinal axis of the through bore 42 and extends from a bottom surface 50 of the housing to the through bore 42. Third and fourth bores 30 and 32 are similarly formed, extending from a top surface 52 of the housing 40 to the through bore 42 and suitably formed at their outer extremities 34 and 36, respectively, to allow connection to fluid conduits 54 and 55 (FIG. 2), respectively, which are connected to cylinders 20 and 22. The bores 30 and 32, as can best be seen in FIG. 3, are equally offset on opposite sides of a plane parallel to their axes and through the axis of the through bore 42. Also formed in housing 40 are suitable means for attachment to the trailer, such as bolt holes 56 and 58 (FIG. 3).

The flow control device 18 further comprises a shaft 60 rotatably mounted in the through bore 42, having a flat 62 formed thereon with a length greater than the distance along the axis of the shaft 60 between the bores 30 and 32 and having bores 64 and 66 formed therein perpendicular to the axis of the shaft 60. The flat 62 forms a space 65 between the shaft 60 and the housing 40. Grooves 68 and 70 are formed around the shaft 60 and are appropriately machined to accept elastomeric seals 72 and 74 and a groove 76 is appropriately machined to accept an axial retaining device such as snap ring 78.

The flow control device 18 also includes a handle 82 suitably connected to the shaft 60 and bushings 84 and 86 which protect the housing 40 from the imposition of loads axial to the shaft 60.

Operation of the flow control device 18 during raising is as follows: With the shaft 60 in position shown in FIGS. 3, 4 and 5, pressurized fluid from the hydraulic power source 19 is introduced into the bore 44, from where it is transmitted through the space 65 formed by the surface of the bore 42 and the flat 62, bores 64 and 66, bores 30 and 32, and conduits 54 and 56 to the cylinders 20 and 22, moving the front of the trailer upwardly with respect to the landing gear legs 14 and 16. In the position shown, bores 64 and 66 are equally open to bores 30 and 32. Thus, if the pressure at which fluid is supplied remains constant, then the flow through each set of passages is equal to the other. In the absence of any load imbalance, the trailer 10 will be raised in a smooth, even manner, maintaining its load bed horizontal as landing gear legs 14 and 16 extend at an equal rate. If an outside force, however, begins to tip the trailer 10 about its vertical axis, to maintain the trailer 10 level it is necessary to reduce the rate of travel of one landing gear leg while increasing that of the other.

Clockwise rotation of the shaft 60, as viewed from the handle end, reduces the rear of the bore 66 that is open to the bore 32 while maintaining the bore 64 in a fully open position with respect to bore 30. Since flow through a valve can be said to be directly proportional to the area of its opening when differential pressure across the valve is constant, the flow to cylinder 22 will decrease and the rate of travel of the trailer load bed with respect to landing gear leg 16 will decrease.

Counterclockwise rotation of shaft 60 during raising reverses the effect, i.e. increasing the rate of trailer bed travel with respect to leg 16. Operation during lowering is the same as far as the operation of the valve 10 is concerned but flow direction is reversed as may be seen by reference to the schematic in FIG. 2.

Figure 8:
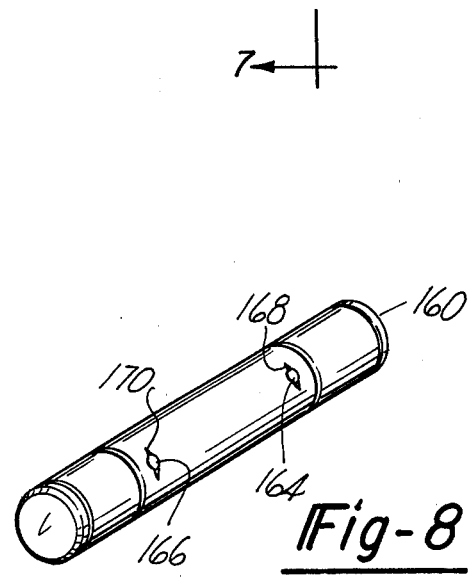
FIG. 8 is a perspective view of an alternate shaft configuration for the rotary control valve of the present invention.

A modification of the shaft 60 affecting the operation described is shown in FIG. 8 wherein a shaft 160 is formed in an identical manner to shaft 60 except that circumferentially extending tapered, elongated notches 168 and 170 are formed on the shaft 160 at transverse bores 164 and 166. These provide for smoother operation requiring more rotational movement for a given percentage change in valve opening area.

Figure 6:
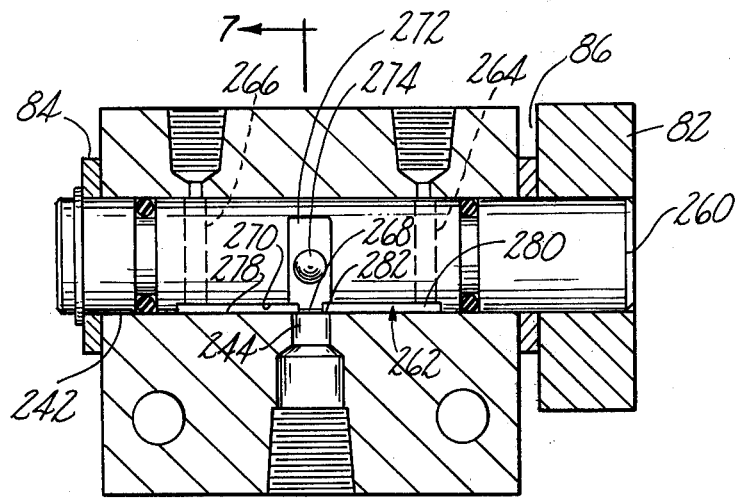
FIG. 6 is a view similar to FIG. 4 but illustrating another preferred embodiment of the present invention.
Figure 7:
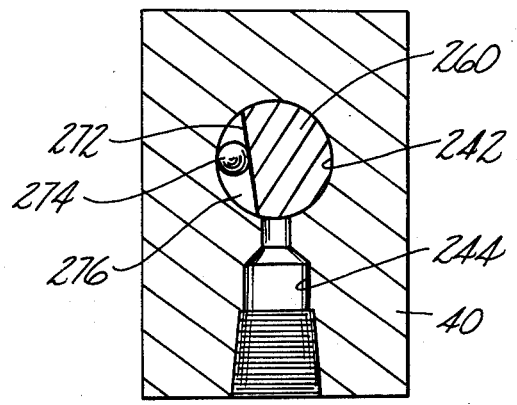
FIG. 7 is a sectional view taken substantially along line 7—7 of FIG. 6.

Another modification, shown in FIGS. 6 and 7, provides hydraulic locking means whereby the cylinders 20 and 22 may be held in some position intermediate the fully extended or fully retracted position. In this version of the invention, a shaft 260 is formed identical to the shaft 60 except that the flat 62 is replaced by two flats 262 and 270 separated by a solid center section 268, the length of which is less than the diameter of the bore 244, and a second flat surface 272 is formed on the shaft 260 at an angle acute to the axis of the bores 264 and 266 as can be most readily seen in FIG. 7. This surface 272 is formed at such a distance from the center line of the shaft 260 to allow assembly of a ball 274 in the space 276 formed between the surface 272 and the bore 242 at the wide end of the space 276.

When the shaft 260 is in the operating position shown in FIGS. 6 and 7, the ball 274 is not in the flow path and pressurized fluid may flow through bores 264 and 266 to and from bore 244. If, however, the shaft 260 is rotated in a counterclockwise manner, as viewed in FIGS. 6 and 7, until the space 276 registers with the bore 244 and pressure is removed from the bore 244, then fluid will tend to flow from the pressurized passages 278 and 280 to the bore 244 and the ball 274, which is of greater diameter than the bore 244, will prevent such flow.

When the shaft 260 is then rotated in a clockwise direction, the surface 272 will act as a cam, reducing the space between the shaft 260 and the bore 242 at the trailing end of the ball 274 and pushing the ball 274 circumferentially ahead, breaking the seal it formed when it seated at the surface 282 of the bore 244 and allowing fluid communication between the bore 244 and spaces 278 and 280.

While it is apparent that the present invention is particularly useful as a system for maintaining a trailer bed level while the trailer is being lowered by the landing gear legs, other uses and advantages for this invention will be obvious to those skilled in the art.

I claim:

1. In a semi-trailer, a system for maintaining the trailer load bed horizontal during raising and lowering that end of the trailer carried by the tractor comprising:

at least a pair of hydraulic cylinders equally spaced from a vertical plane through and including the longitudinal axis of said semi-trailer and suitably disposed to raise and lower said semi-trailer;

a source of pressurized fluid for operating said cylinders;

a valve for controlling the operation of said cylinders, said valve comprising a housing formed with a bore therethrough and with two transverse bores intersecting said through bore equidistant from but on opposite sides of a plane through and parallel to the axis of elongation of said through bore and communicating with said hydraulic cylinders and with a transverse intersecting bore along said plane communicating with said source of pressurized fluid;

said valve further comprising a shaft rotatably mounted within said through bore on which is formed a flat registering with said third transverse bore and in which are formed two transverse bores extending from said flat through said shaft; means for axially retaining said shaft in said through bore; means for sealing said through bore and means exterior of said housing to rotate said shaft between a position in which said flat registers with said transverse intersecting bore and said transverse bores in said shaft respectively equally register with said transverse bores in said housing and positions in which registration between said transverse bores in said shaft and in said housing are not in equal registration whereby the rate of operation of said cylinders is equal in said first mentioned position of said shaft and the rate of operation of said cylinders is equal in said first mentioned position of said shaft and the rate of operation of one of the cylinders is inversely proportional to the rate of operation of the other cylinder at other positions of said shaft.

2. The load leveling device as defined in claim 1 and further comprising a second flat inclined with respect to the axis of said third transverse bore and a ball of larger diameter than said third transverse bore which is inserted into a cavity formed by the flat within the through bore and which serves to prevent the flow of pressurized fluid out of the leveling device unless said shaft is turned, causing said ball to be moved from the inner opening of said third transverse bore to prevent the flow of pressurized fluid from the device.

3. A load leveling device as defined in claim 1 and in which said shaft further includes circumferentially extending tapered notches on each side of said transverse bores, effecting a smaller change in valve opening area for a given shaft rotation.

* * * * *

UNITED STATES PATENT OFFICE
CERTIFICATE OF CORRECTION

PATENT NO. : 3,874,682
DATED : 4-1-75
INVENTOR(S) : Thomas B. Dalton

It is certified that error appears in the above-identified patent and that said Letters Patent are hereby corrected as shown below:

Col. 3, line 15, delete 10 and insert --18--.

Signed and sealed this 24th day of June 1975.

(SEAL)
Attest:

RUTH C. MASON
Attesting Officer

C. MARSHALL DANN
Commissioner of Patents
and Trademarks